(12) United States Patent
Gobbo et al.

(10) Patent No.: US 8,549,270 B2
(45) Date of Patent: Oct. 1, 2013

(54) SELF-RESTORING ON-BOARD INFORMATION SYSTEM

(75) Inventors: Gilles Gobbo, Aucamville (FR); Magalie Escourbiac, Balma (FR)

(73) Assignee: Airbus Operations SAS, Toulouse (FR)

( * ) Notice: Subject to any disclaimer, the term of this patent is extended or adjusted under 35 U.S.C. 154(b) by 1315 days.

(21) Appl. No.: 12/034,253

(22) Filed: Feb. 20, 2008

(65) Prior Publication Data

US 2008/0209195 A1  Aug. 28, 2008

(30) Foreign Application Priority Data

Feb. 22, 2007 (FR) ...................................... 07 53429

(51) Int. Cl.
*G06F 9/00* (2006.01)
(52) U.S. Cl.
USPC .................................................. 713/1; 713/2
(58) Field of Classification Search
USPC .......................................................... 713/1, 2
See application file for complete search history.

(56) References Cited

U.S. PATENT DOCUMENTS

| | | | | |
|---|---|---|---|---|
| 5,848,367 A * | 12/1998 | Lotocky et al. | ................. | 701/36 |
| 5,974,547 A * | 10/1999 | Klimenko | ......................... | 713/2 |
| 7,607,000 B1 * | 10/2009 | Smith et al. | ....................... | 713/1 |
| 2001/0039612 A1 * | 11/2001 | Lee | .................................... | 713/2 |
| 2001/0052069 A1 * | 12/2001 | Sekiguchi | ......................... | 713/2 |
| 2004/0044889 A1 * | 3/2004 | Kamataki | .......................... | 713/2 |
| 2004/0193867 A1 * | 9/2004 | Zimmer et al. | .................... | 713/2 |
| 2005/0198485 A1 * | 9/2005 | Nguyen et al. | .................... | 713/1 |
| 2006/0020821 A1 * | 1/2006 | Waltermann et al. | ......... | 713/189 |
| 2006/0117172 A1 * | 6/2006 | Zhang et al. | ..................... | 713/2 |
| 2006/0174099 A1 * | 8/2006 | Wang | ................................ | 713/1 |
| 2006/0179324 A1 * | 8/2006 | Hatakeyama | ................. | 713/187 |
| 2006/0206699 A1 * | 9/2006 | Yokota et al. | ..................... | 713/1 |
| 2006/0206702 A1 * | 9/2006 | Fausak | .............................. | 713/2 |
| 2006/0242395 A1 * | 10/2006 | Fausak | .............................. | 713/1 |
| 2007/0214348 A1 * | 9/2007 | Danielsen | ......................... | 713/2 |
| 2008/0126786 A1 * | 5/2008 | Kumagai | .......................... | 713/2 |
| 2008/0141015 A1 * | 6/2008 | Chalemin et al. | ................ | 713/2 |

FOREIGN PATENT DOCUMENTS

WO  WO 00/52570  9/2000

* cited by examiner

*Primary Examiner* — Kim Huynh
*Assistant Examiner* — Zahid Choudhury
(74) *Attorney, Agent, or Firm* — Oblon, Spivak, McClelland, Maier & Neustadt, L.L.P.

(57) ABSTRACT

This invention relates to an on-board information system, including a central processing unit; a first non-rewritable memory containing a boot program; a volatile memory; and a second non-rewritable memory containing an operating system as well as a set of executable files. The boot program is configured to load the operating system and at least a portion of the executable files into the volatile memory when the on-board information system is initialized.

9 Claims, 3 Drawing Sheets

SELF-RESTORING ON-BOARD INFORMATION SYSTEM

TECHNICAL FIELD

This invention relates in general to the field of computer security, in particular that of an on-board information system, such as an avionics system.

PRIOR ART

On-board information systems are essential features of the safety of an aircraft. To illustrate, an on-board information system can include avionics systems to carry out a flight command, to control an aircraft component, to measure a flight parameter, to monitor a portion of the aircraft, an electronic flight manual, or else any other telecommunication system ensuring on-board or air-to-ground communication. Malfunctioning of an on-board information system is likely to impact the operation of the aircraft or the piloting thereof.

Information systems are generally connected to an on-board network, typically a network compliant with the ARINC 429 standard or with the ARINC 664 standard, the latter being called an AFDX network (Avionics Full Duplex). This network is partitioned into separate security level areas. The highest security level area includes, in particular, the information and control systems situated in the cockpit and avionics bay. The lowest security level area corresponds to the cabin and is therefore accessible at the passenger user terminals.

The safety of the aircraft greatly depends upon the integrity of the software programs hosted by the information systems. Such being the case, these software programs are liable to corruption due to attacks coming from a passenger user terminal or even a maintenance terminal. Various measures have been proposed for preventing these attacks, including, among other things, the establishment of unidirectional transmission links between various security level areas or electronic signature of the on-board software programs. An exemplary partitioned network application having unidirectional transmission links between areas is found in French Patent Application FR 06 54406, filed by the present applicant. Electronic signature by on-board software programs, by means of a key, enables subsequent verification of the integrity thereof. This is the case, in particular, when these software programs have been downloaded via a maintenance terminal, as part of an updating operation.

However, the aforesaid measures prove to be particularly constraining. In practice, it is almost impossible to ensure the absolute inviolability of the highest security level area, insofar as it is also desirable to have network access points for maintenance purposes. Furthermore, the electronic signature of a software program does not guarantee that it cannot be accidentally or intentionally deleted or substituted. In the event that a software program in an information system is corrupted, deleted or substituted, it must be completely re-installed from a back-up copy, which is detrimental in terms of an operating interrupt.

The purpose of this invention is to propose a high-integrity, robust avionics system which is compatible with the use of an unsecured network.

DISCLOSURE OF THE INVENTION

This invention is defined by an on-board information system comprising:
a central processing unit;
a first non-rewritable memory containing a boot program;
a volatile memory;
a second non-rewritable memory containing an operating system as well as a set of executable files, said boot program being adapted to load the operating system and at least a portion of the executable files into the volatile memory when the on-board information system is initialised.

Said second non-rewritable memory advantageously also contains all of the permanent data files required for executing said executable files via said processing unit.

The boot program is preferably adapted to load said permanent data files into the random access memory when said on-board system is initialized. The first non-rewritable memory is, for example, a ROM memory.

The second non-rewritable memory is advantageously a read-only hard disk, a read-only flash memory, a CD-ROM or a DVD.

The invention is also defined by a network system comprising a plurality of on-board information systems, each on-board information system comprising a processing unit, a first non-rewritable memory containing a boot program as well as a volatile memory, said network system further comprising:
a plurality of file servers, each server comprising a non-rewritable mass memory;
an on-board network to which said on-board systems and said file servers are connected;
wherein, for at least one of said on-board systems, the boot program is adapted, upon each initialisation, to download, from at least one of said servers, an operating system and/or an executable file or files and to store it/them in said volatile memory.

Preferentially, at least one of said on-board information systems comprises a second non-rewritable memory in which said operating system is stored.

According to one alternative, the network system includes at least two file servers the respective mass memories of which contain identical files.

Files are preferably downloaded from said servers according to a secure file transfer protocol.

Finally, the invention is also defined by an aircraft comprising an on-board information system or a network system, as set out hereinabove.

BRIEF DESCRIPTION OF THE DRAWINGS

Other characteristics and advantages of the invention will become apparent upon reading about one preferred embodiment of the invention, in reference to the appended figures wherein.

DETAILED DISCLOSURE OF PARTICULAR EMBODIMENTS

The invention starts with the premise that, since an attack on an information system, in particular via the on-board system, cannot be excluded, this system must have a high level of integrity.

Figure 1:
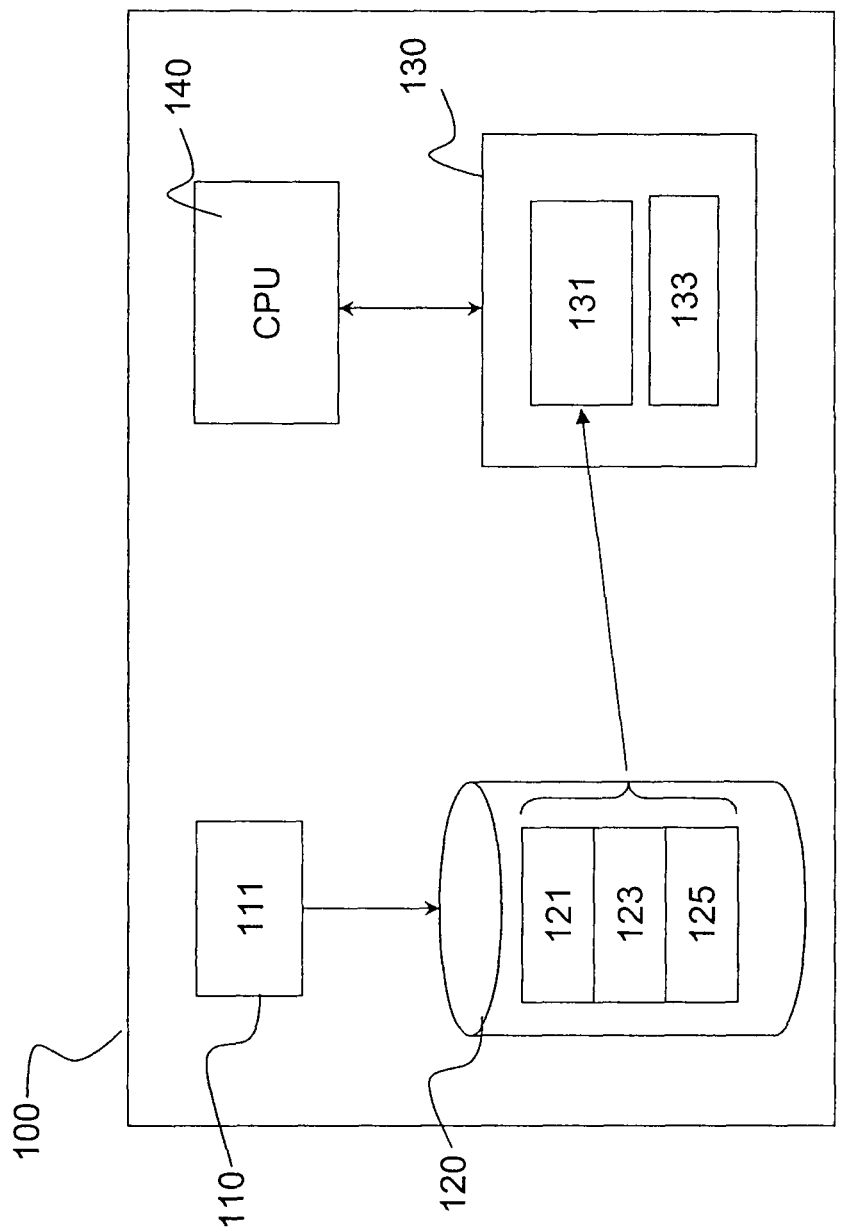
FIG. 1 is a schematic illustration of an information system according to a first embodiment of the invention.

FIG. 1 shows an on-board information system 100 such as this. It includes a first non-rewritable memory 110, a second non-rewritable memory 120, a volatile memory 130 and a processing unit 140. A non-rewritable memory is understood to mean an exclusively read-accessible memory, in other words a memory in which any writing is physically impossible. This is the case, in particular, for a ROM memory in the strict sense of the term, excluding any EEPROM-type memory or flash memory (unlocked). A conventional CD-ROM or even a DVD, a hard disk or a read-only flash memory can also be cited as examples of a non-rewritable memory.

The first non-rewritable memory 110 is preferably a ROM memory which contains a boot program or "boot loader" 111. The second non-rewritable memory 120 contains the operating system 121 as well as all of the executable files 123 enabling the information system to perform the function that it is intended to fulfil. This memory also includes the permanent data files 125, when such data is used by the executable programs. Permanent data is understood to mean constants as opposed to variables or non-permanent data such as that resulting from a measuring process. The executable files and the data files will be stored separately for each application.

The volatile memory 130 is advantageously partitioned into a first memory area 131 intended for storing the operating system as well as at least a portion of the executable files and aforementioned data files, and a second memory area 133 intended for storing the non-permanent data of the system.

During start-up of the information system, either by means of a software program (soft reboot) or by powering up (hard reboot), the operating system and all or some of the executable files are loaded into area 131 of the volatile memory 130 by the boot program 111. Each time the information system shuts down, the contents of the volatile memory 130 are erased. In this way, the integrity of the software programs hosted by the information system is guaranteed and the start-up state of the latter is completely defined.

This situation is to be carefully distinguished from a BIOS system which is present in the read-only memory of a motherboard, a video card or network of a computer, and which is executed during the start-up thereof. As a matter of fact, in this case, the BIOS functions only as a bootstrap: it limits itself to declaring the disks, to configuring the components and to searching for an operating system prior to booting it up. Conventionally, the operating system is simply stored on a hard disk.

By contrast, according to this embodiment of the invention, the operating system 121, all of the executable files 123 and, where appropriate, all of the permanent data files 125, are stored in the non-rewritable memory 120.

Figure 2:
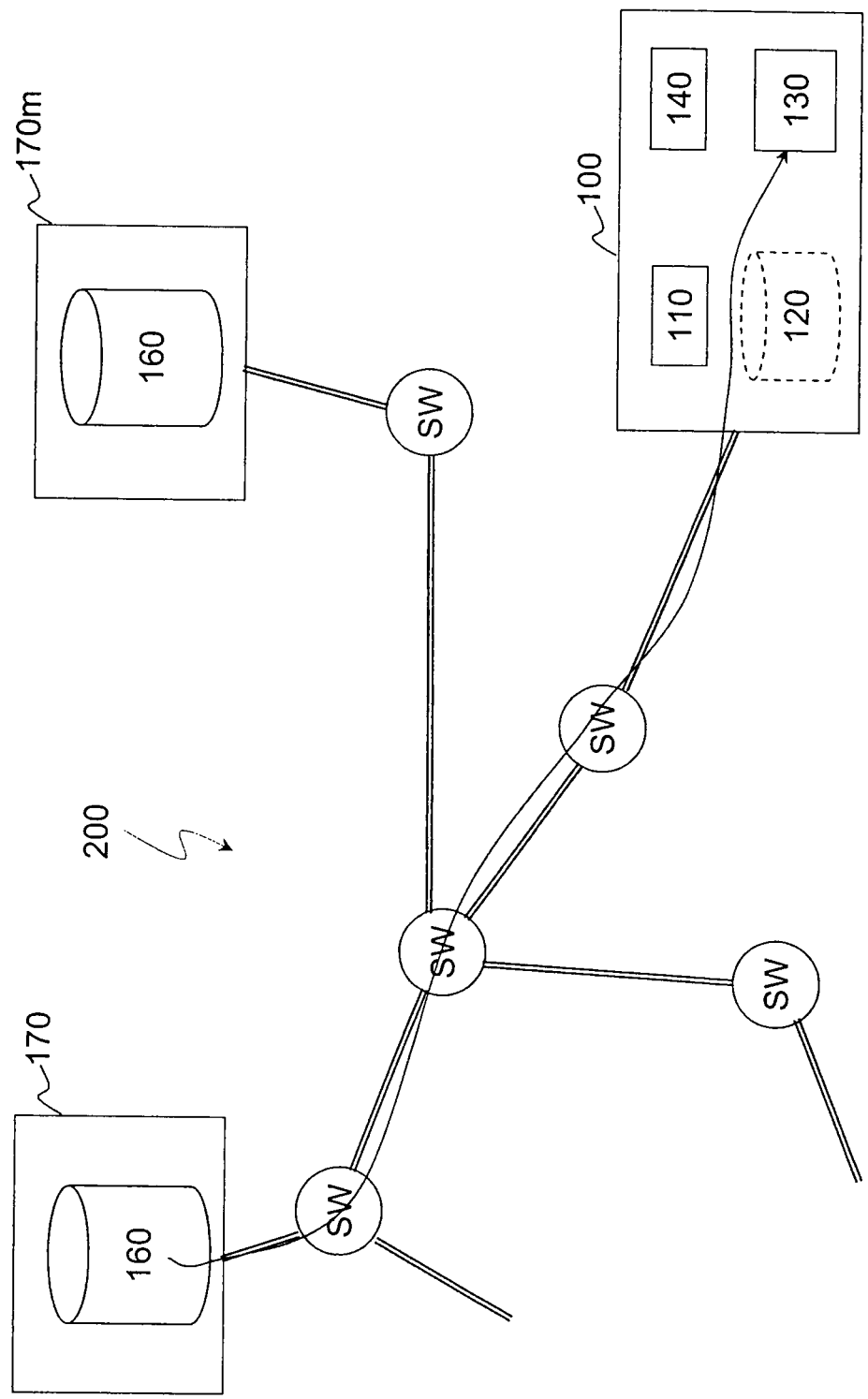
FIG. 2 is a schematic illustration of a network system according to a second embodiment of the invention.

FIG. 2 shows a second embodiment of the invention, in which the information systems 100 are connected to an on-board network 200, e.g., an AFDX network. Unlike the first embodiment, the information systems do not store the operating systems, executable files and, where appropriate, permanent data files thereof individually. All of these files are stored in a non-rewritable read-only memory 160 of at least one file server 170. Several servers 170 are preferably foreseen in the network, according to a distributed network architecture, so as to accelerate file transfers. At least one mirror server 170m is associated with each file server 170, making it possible to compensate for a possible failure thereof or for that of a network component (e.g., a switch SW).

During initialisation (software-activated or by powering up) of an information system 100, a boot program residing in a non-rewritable local memory 110 transmits a file transfer request to the server 170 assigned thereto. These files include, in particular, the operating system, the executable files and the permanent data associated therewith. According to an alternative embodiment indicated by dotted lines, the operating system is resident in the non-rewritable local memory 120, whereby only the executable files and the permanent data files are transferred via the network. File transfer is advantageously carried out in secure encryption mode, e.g., according to the FTPS protocol (File Transfer Protocol over SSL), with verification of the integrity of the encrypted files received being undertaken by the boot program. In the event of an error due to a server or network failure (e.g., a switch), the boot program automatically switches over to the mirror server.

This second embodiment in particular has the advantage of sharing certain files between information systems as well as having greater serviceability.

According to one exemplary application, the network 200 is that of an NSS system (Network Server System), as defined in the ARINC 763 standard, and the file server 150 is an NSU unit (Network Server Unit).

Figure 3:
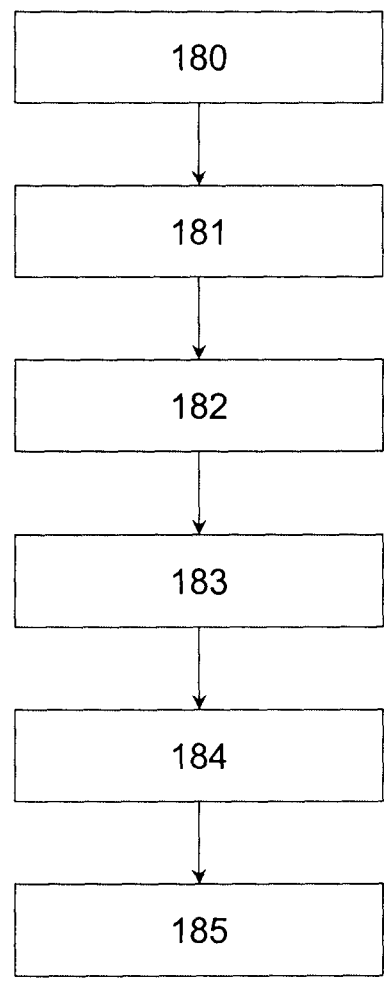
FIG. 3 shows an exemplary use of the invention.

FIG. 3 shows a use of the system according to the invention. The differences between the first and second embodiments will be ignored herein, the principle of operation being the same in both cases.

An information system can be rebooted by means of a powering-down operation followed by a powering-up operation, the operation of a boot button (hardware interrupt), or even a software interrupt (a combination of keys on a keyboard).

This rebooting can be carried out upon the occurrence of an operating incident or each time the aircraft lands.

Routine rebooting preferably occurs after ground maintenance operations, as indicated in FIG. 3.

Phase 180 corresponds to the landing of the aircraft.

The maintenance operations begin at 181. These comprise, in particular, access to the on-board network, including, in particular, data transfers between the maintenance terminal and the information systems, conventionally carried out according to a protocol defined in the ARINC 615 standard.

The maintenance operations are completed at 182. All network access is then physically closed, whereby said network is closed off from the outside.

At 183, all of the information systems are reinitialised by being shut down and powered up again, by pressing on the reboot button or by being software-activated.

At 184, after rebooting, the system is in a nominal configuration, defined unequivocally by the executable files and permanent data files stored in the non-rewritable memories 120 and/or 160. The aircraft is then ready to start a new operating cycle at 185.

The invention claimed is:

1. An on-board information system for an aircraft, comprising:
   a central processing unit;
   a first non-rewritable memory containing a boot program;
   a volatile memory; and
   a second non-rewritable memory containing an operating system of the on-board information system and a set of executable files,
   wherein, after maintenance operations comprising data transfers between a maintenance terminal and said on-board information system have been completed,
   said on-board information system is initialized by being shut down and powered up again, and
   said boot program is configured after said powering up to load, in a secure encryption mode, and verify the integrity of the operating system and at least a portion of the executable files into the volatile memory.

2. The on-board information system according to claim 1, wherein said second non-rewritable memory also contains all of the permanent data files required for executing said executable files via said central processing unit.

3. The on-board information system according to claim 2, wherein the boot program is configured to load said permanent data files into the volatile memory when said on-board system is initialized.

4. The on-board information system according to claim 1, wherein the first non-rewritable memory is a ROM memory.

5. The on-board system according to one of the preceding claims, wherein the second non-rewritable memory is a locked read-only hard disk, a locked read-only flash memory, a CD-ROM or a DVD.

6. A network system including a plurality of on-board information systems for an aircraft, each being run by a software program in order to perform a predetermined function and including a processing unit, a first non-rewritable memory containing a boot program, as well as a volatile memory, said network system comprising:

a plurality of file servers, each server including a non-rewritable mass memory; and an on-board network to which said on-board information systems and said file servers are connected, wherein for at least one of said on-board information systems, after maintenance operations comprising data transfers between a maintenance terminal and said at least one on-board information system have been completed, said at least one on-board information system is initialized by being shut down and powered up again, and said boot program is configured after said powering up to download in a secure encryption mode, from at least one of said servers, an operating system of the on-board information system and an executable file or files, and verify the integrity of the operating system and said executable file or files, said operating system being stored in a second non-rewritable memory, and to load said operating system and said executable file or files into said volatile memory.

7. The network system according to claim 6, wherein the network system includes at least two file servers, the respective mass memories of which contain identical files.

8. The network system according to one of the claims 6 to 7, wherein files are downloaded from said servers according to a secure file transfer protocol.

9. An aircraft comprising an on-board information system according to claim 1.

* * * * *